A. Rickard,
Plow
No. 111,975.   Patented Feb. 21, 1871.

Witnesses:
J. S. Mabee
Alex. F. Roberts

Inventor:
Alex. Rickard
per Mumn & Co
Attorneys.

UNITED STATES PATENT OFFICE.

ALEXANDER RICKARD, OF SCHOHARIE, NEW YORK.

IMPROVEMENT IN PLOWS.

Specification forming part of Letters Patent No. 111,975, dated February 21, 1871.

*To all whom it may concern:*

Be it known that I, ALEXANDER RICKARD, of Schoharie, in the county of Schoharie and State of New York, have invented a new and useful Improvement in Plows; and I do hereby declare that the following is a full, clear, and exact description thereof, which will enable others skilled in the art to make and use the same, reference being had to the accompanying drawings, forming part of this specification.

Figure 1:
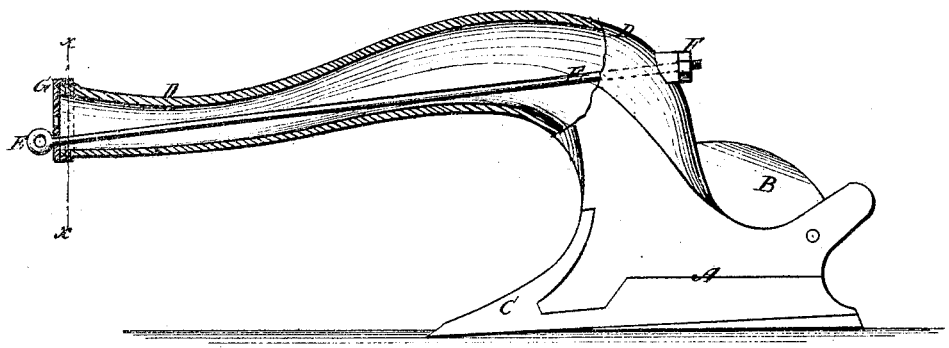
Figure 2:

Figure 1 is a side view of a plow to which my improvement has been attached, partly in section through the beam. Fig. 2 is a detail cross-section of the same, partly in section through the line $x\ x$, Fig. 1.

My invention relates to plows; and it consists in the following improvements thereon: first, in throwing back the point of draft beyond the forward part of the mold-board, and on the back part of the beam, to give a steady and level run to the plow upon its sole, to change the location of the strain upon the beam, and to place the point of draft near the center of resistance; second, in a rotary plate which shall have an average central hole for the draft-rod, wherein the latter is locally unaffected by the rotation of the plate, while the plate also has one or more holes radially distant therefrom, which will vary both depth and width of furrow.

A represents the landside, B the mold-board, and C the point, of the plow, about the construction of which parts there is nothing new.

D is the plow-beam, which is made hollow, as shown in Figs. 1 and 2.

E is the draft-rod, the rear end of which passes out through a hole formed for it in the rear of the bend of the beam, and is secured in place by a nut, F, as shown in Fig. 1, a seat being formed upon the said beam for the said nut, as shown. The forward end of the rod E passes out at the forward end of the beam D, and has an eye or hook formed upon it for the attachment of the draft.

G is a flanged plate fitting upon the end of the hollow beam D, to which it is secured by a bolt or pin passing through one or the other of the holes through the flange of the said plate G, and through a hole formed for it in the beam D. The plate G has a hole formed through its center for the passage of the draft-rod E, for ordinary plowing. Another hole is formed in the plate G, at the side of its center, as shown in Fig. 2, for the passage of the draft-rod E, as shown in Fig. 2, so that by turning the plate G upon the end of the beam D the plow may be adjusted to cut a wider or narrower furrow, or to run deeper or shallower in the ground, as may be desired.

Having thus described my invention, I claim as new and desire to secure by Letters Patent—

The flanged rotary perforated cap G, combined with a hollow beam, D, and draft-rod E, as set forth.

ALEXANDER RICKARD.

Witnesses:
 JOHN J. DIETZ,
 SENECA WARNER.